(12) United States Patent
Dearing et al.

(10) Patent No.: US 11,379,782 B2
(45) Date of Patent: Jul. 5, 2022

(54) SYSTEM AND METHOD OF ELECTRONIC AND PHYSICAL MAIL CATEGORIZATION AND TARGETED DELIVERY

(71) Applicant: United States Postal Service, Washington, DC (US)

(72) Inventors: Stephen M. Dearing, Herndon, VA (US); Carla F. Sherry, Annandale, VA (US)

(73) Assignee: United States Postal Service, Washington, DC (US)

( * ) Notice: Subject to any disclaimer, the term of this patent is extended or adjusted under 35 U.S.C. 154(b) by 1155 days.

(21) Appl. No.: 14/850,757

(22) Filed: Sep. 10, 2015

(65) Prior Publication Data

US 2016/0004992 A1    Jan. 7, 2016

Related U.S. Application Data

(62) Division of application No. 13/179,442, filed on Jul. 8, 2011, now abandoned.

(60) Provisional application No. 61/399,279, filed on Jul. 9, 2010.

(51) Int. Cl.
```
G06Q 10/08      (2012.01)
G06F 16/245     (2019.01)
H04L 51/00      (2022.01)
B07C 3/00       (2006.01)
```
(52) U.S. Cl.
CPC ............ *G06Q 10/083* (2013.01); *B07C 3/00* (2013.01); *G06F 16/245* (2019.01); *H04L 51/12* (2013.01); *G06Q 2220/00* (2013.01)

(58) Field of Classification Search
CPC ............................................ G06Q 10/08–0875
See application file for complete search history.

(56) References Cited

U.S. PATENT DOCUMENTS

| | | |
|---|---|---|
| 5,892,900 A | 4/1999 | Ginter et al. |
| 7,204,415 B2 | 4/2007 | Payne et al. |
| 7,337,152 B1 | 2/2008 | Gawler |
| 7,391,781 B2 | 6/2008 | Payne et al. |
| 7,729,359 B1 | 6/2010 | Kumar |
| 7,813,524 B2 * | 10/2010 | Keller ................. B07C 3/00 382/101 |

(Continued)

*Primary Examiner* — John W Hayes
*Assistant Examiner* — Taylor S Rak
(74) *Attorney, Agent, or Firm* — Knobbe, Martens, Olson & Bear, LLP

(57) ABSTRACT

Embodiments include systems and methods of a service that allows hard copy and electronic media customers to proactively specify, across a broad range of categories, the hard copy mail and/or electronic media mail that they would or would not like to receive. Embodiments include methods and systems configured to allow customers of delivery services to customize the flow of physical items such as hard copy or other letters or parcels, for delivery or electronic media mail from mailers based on highly specific customer-designated criteria. The delivery service acts as a trusted third party to serve as the intermediary between the recipient of the items and mailers to provide privacy and manage a repository for a customer-selected criteria database. In addition, one embodiment provides verification and/or identification that mail being sent meets the customer's designated criteria.

17 Claims, 7 Drawing Sheets

(56) References Cited

U.S. PATENT DOCUMENTS

| | | | |
|---|---|---|---|
| 7,894,448 B1* | 2/2011 | Lillibridge | G06Q 30/02 |
| | | | 370/389 |
| 2003/0045945 A1* | 3/2003 | Lopez | B07C 3/14 |
| | | | 700/2 |
| 2003/0110130 A1* | 6/2003 | Pelletier | G06Q 30/02 |
| | | | 705/50 |
| 2003/0114206 A1 | 6/2003 | Timothy et al. | |
| 2005/0131961 A1 | 6/2005 | Margolus et al. | |
| 2005/0197966 A1* | 9/2005 | Payne | G07B 17/00508 |
| | | | 705/62 |
| 2005/0259658 A1* | 11/2005 | Logan | H04L 67/306 |
| | | | 370/392 |
| 2006/0074978 A1 | 4/2006 | Blasi et al. | |
| 2007/0136215 A1* | 6/2007 | Fogel | B07C 3/18 |
| | | | 705/410 |
| 2007/0192191 A1 | 8/2007 | Neal et al. | |
| 2008/0208611 A1* | 8/2008 | Krooss | G06Q 10/08 |
| | | | 705/1.1 |
| 2009/0159509 A1* | 6/2009 | Wojdyla | B07C 3/18 |
| | | | 209/584 |
| 2010/0217613 A1 | 8/2010 | Kelly | |

\* cited by examiner

SYSTEM AND METHOD OF ELECTRONIC AND PHYSICAL MAIL CATEGORIZATION AND TARGETED DELIVERY

CROSS-REFERENCE TO RELATED APPLICATIONS

This application is a divisional of U.S. patent application Ser. No. 13/179,442, filed Jul. 8, 2011, which claims the benefit of and priority to U.S. Provisional Application No. 61/399,279, filed Jul. 9, 2010, the entire contents of which are hereby incorporated in their entireties.

BACKGROUND OF THE INVENTION

Field of the Invention

The present application relates to methods and systems for delivery of mail and other packages.

Description of the Related Technology

Mail customers are finding ways to control what they receive or what they would like to receive within both their physical mailbox and their electronic mailbox. For example, by supporting "Do Not Mail Initiatives" recipients can block generic types of mail from being delivered; and with "Spam Filters", email recipients can block receipt of specific emails on a case by case basis. However, a need exists for systems that can integrate such preferences across the various types of media.

SUMMARY OF CERTAIN INVENTIVE ASPECTS

The system, method, and devices of the embodiments each have several aspects, no single one of which is solely responsible for its desirable attributes. Without limiting the scope of the disclosed invention(s) as expressed by the claims which follow, its more prominent features will now be discussed briefly. After considering this discussion, and particularly after reading the section entitled "Detailed Description of Certain Embodiments" one will understand how the features of the invention(s) provide advantages that include improved recipient control over delivery of physical items such as mail and packages and/or electronic mail delivery.

DETAILED DESCRIPTION OF CERTAIN EMBODIMENTS

Figure 1:
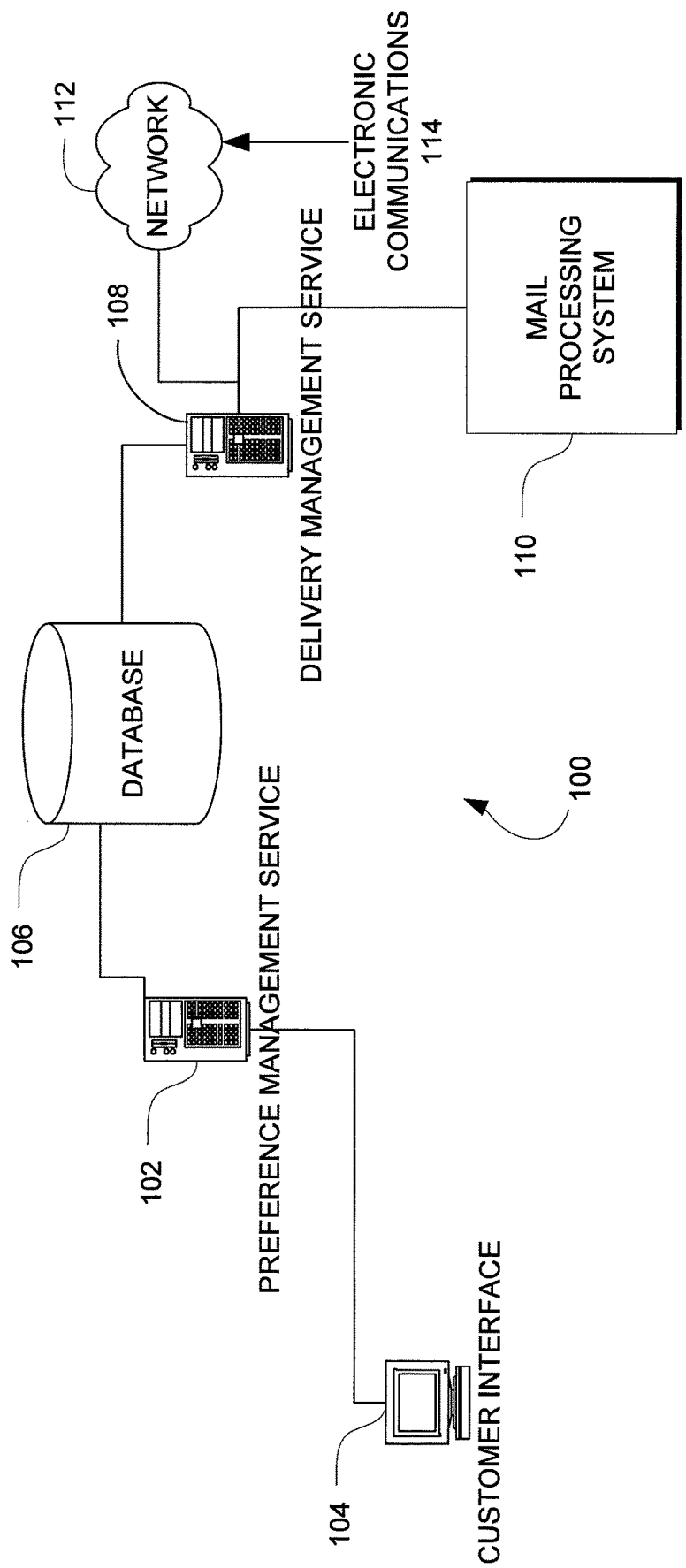
FIG. 1 is a block diagram illustrating systems for delivering electronic and physical communications according to one embodiment.

The following detailed description is directed to certain specific embodiments. However, the invention(s) disclosed herein can be embodied in a multitude of different ways as defined and covered by the claims. In this description, reference is made to the drawings wherein like parts are designated with like numerals throughout.

Reference to the term "mail" or "media" includes letters, media, cards, periodicals, correspondence, packages and other items that are handled and distributed in or by a delivery system, including an electronic delivery system, and the terms are used interchangeably herein.

Many existing systems that provide control of hard copy or electronic delivery of advertising and other types of targeted email, provide limited "all or nothing" options for recipients. Moreover, such systems are typically implemented ad hoc, on a per mailer basis, thereby requiring substantial overhead for recipients to express their preferences.

A service that allows hard copy and electronic media customers to proactively specify, across a broad range of categories, the hard copy and/or electronic media or mail that they would or would not like to receive is hence desirable. In particular, a need exists to assist customers by providing a valuable new service to address the customization and directing of both hard copy and electronic media mail between recipients and mailers. Moreover, a need exists for such services to be provided while maintaining customer privacy. Embodiments disclosed herein can be configured to provide such features.

Embodiments include methods and systems configured to allow postal customers or customers of other delivery services to customize the flow of mail for delivery based on highly specific, customer-designated criteria. These mail items include physical items such as hard copy or other letters or parcels for delivery, or electronic media from mailers. Delivery services, such as the United States Postal Service, act as a trusted third party to serve as the intermediary between the recipient of the items and mailers in order to provide privacy and to manage a repository for a customer-selected criteria database. In addition, embodiments can provide verification and/or identification that mail being sent meets the customer's designated criteria. Embodiments can allow mailers to send any item at their discretion but provide the participating mailers with the specific information about what mail customers do and do not want to receive. Embodiments can also provide customers a designation/identification option to ensure that mail they are receiving meets the criteria they designate. Embodiments can also provide an added-value to customers by allowing customers to provide such preferences while ensuring the customers privacy. Embodiments also can provide customers value added features such as expressing a characteristic or personality through the implementation of virtual vanity addresses.

Currently, in the electronic media arena, businesses send or present electronic communication/information to customers in an electronic format through their Internet providers as email or via other electronic media mail processes. The recipients of these messages have limited capability to proactively identify and/or eliminate what they determine to be spam, phishing or other undesired or malevolent correspondence. Further, the recipients do not have the capability of identifying and setting preferences as to what they would like to receive within that electronic mailbox or via electronic media.

These same principles apply to the physical mailbox where customers may have preferences regarding receipt of various categories of advertising materials based on not having an interest in the subject, environmental reasons for wishing to reduce paper consumption and landfill usage, or a multitude of other reasons. When using mail or express mail, unlike with electronic mail, customers do not have an easy methodology for establishing mail receipt preferences without having their physical or postal mailing address identified.

Voluntary repositories of physical mail delivery preferences exist, such as those provided by the Direct Mail Marketing Association. However, participation by mailing entities in these repositories has tended to be voluntary, which can therefore lead to frustration for customers who receive unwanted materials from non-participating mailers. Moreover, customers may have privacy concerns about registering their name and mailing address with such often untrusted repositories.

FIG. 1 is a block diagram illustrating a system 100 for electronic and physical mail categorization and targeted delivery. The system 100 includes a preferences manager 102 that receives input from a customer interface 104 to manage a preferences database 106. A delivery management service 108 provides access to the database 106, as well as to other delivery management functions as disclosed herein, to a mail processing system 110. The mail processing system 110 includes mail sorting, processing, labeling, and other mail processing equipment, which may be located at one or more mail processing facilities, to effectuate mail delivery preferences. The delivery management service 108 may be co-located with, or in communication with via a data communications network, the mail processing system 110.

In one embodiment, the delivery management service 108 communicates with a network 112, such as the Internet or other electronic communications network, to receive electronic communications 114 for management by the delivery management service 108. In one embodiment disclosed herein, the electronic communications 114 comprise e-mail messages. However, in some embodiments, the electronic communications may include, for example, e-mail, text messages, SMS messages, chat messages via protocols such as ICQ, Yahoo messenger, AIM, MSN, Google Talk, or Jabber. Moreover, in some embodiments, electronic communications may include advertisements accessed by customers via a web browser, for example, banner ads and/or pop-ups, or via any other electronic medium.

It is to be recognized that the system 100 as illustrated in FIG. 1 depicts components for performing a number of functions described herein. However, embodiments may perform less than all such functions. Accordingly, embodiments of the system 100 may include some or all of the illustrated components as is apparent to one of skill in the art in view of the disclosure herein.

The preference management system 102 comprises a processor, which, for example, is embodied as a computer server and associated software. The preference management system 102 may communicate with the customer interface 104 by a public or private communications interface. The preference management system 102 receives message and item delivery preferences from the customer interface 104 and stores data indicative of the preferences to the database 106.

The customer interface 104 comprises one or more of a kiosk located in a public facility, software executed by an electronic device of the customer, such as a personal computer, mobile telephone, or other communications enabled device, or a web based interface provided via a web browser associated with an electronic device of the customer and communicated by a public network, for example a global communications network such as the world wide web.

The delivery management service 108 provides an interface to the preferences database 106 and instructs the mail processing system 110 on delivery of mail items based on the information provided by the database 106. In one embodiment, the delivery management service 108 may control delivery of electronic communications 114, either directly via related electronic communications servers, or indirectly by providing delivery information to any suitable system for delivering the electronic communications 114. In one embodiment, the delivery management service 108 comprises a processor, which, for example, is embodied as a computer server and associated software.

Desirably, in one embodiment, the database 106 provides a delivery database that associates one or more types of data. For example, in one embodiment, the database 106 provides data to enable customers to define preferences indicative of what hard-copy or electronic media mail that they do/do not want to receive. For example, the database may store data indicative of customer preferences related to receiving hard copy and/or electronic communications such as e-mail on a variety of general to specific topics, categories and subjects. In addition, the database 106 may store data indicative of general or specific topics, categories and subjects from which customers do not want to receive mail. Customers may thus communicate their desires to receive specific types of mail by specific categories, characteristics, classes, or other features via the customer interface 104.

In one embodiment, customers can configure the delivery management system 108 to provide a specific designation to physical or electronic communications that indicates that the particular item has been vetted and is provided in accordance with the customers' preferences via the delivery management system 108.

In one embodiment, the database 106 stores data indicative of the customer in the form of a hash value indicative of the physical or mailing address of the customer. The database 106 relates this hash value with the customer preference data and other customer related data. The hash value may comprises a cryptographic hash value such as a SHA-1 hash. The database 106 may comprise computer readable medium having the herein described data stored thereon. In one embodiment, the database 106 may further comprise a processor and/or database management software such as a relational database server to manage and provide a searchable interface to the data stored on the computer readable medium.

In one such embodiment, the database 106 relates only non-identifying data with the hash value. Desirably, the database 106 can thus be shared with mailers or can be otherwise distributed without providing customer addresses and other identifying information because the other information is only provided when the correct information needed to generate the stored hash value is submitted. Copies can be provided to any delivery and/or emergency services for mapping the virtual addresses to physical addresses as needed. In one embodiment, the delivery management service 108 is configured to provide address data for a virtual address via an electronic interface. In one such embodiment, the delivery management service 108 may be configured to communicate access data to a billing or other account management system where free access is undesirable such as in response to high volume commercial mailer inquiries.

For example, copies of the database 106 can be distributed to physical or electronic mailers to enable the mailers to access information in order to know customer mailing preferences based on the criteria designated by the recipient.

This is done without providing a list of actual customer names and/or addresses. Participating mailers can be provided authorization to provide communications to customers via one or both of physical or electronic methodologies that are identified as being in accordance with the preferences in the database 106 and hence are more desirable for the customer to view. Such identification and authorization may be provided via electronic signatures or other suitable cryptographic authentication techniques. Electronic communications such as e-mail, headers or other metadata can include electronic signature data to authenticate the communication as being in accordance with the customer's preferences stored in the database 106. Physical communications may be labeled via the sender or via a postmark or other validating indicia provided during delivery by the delivery service, such as by the United States Postal Service, for example.

A "virtual address" or "vanity address" is arbitrary character data defined by a mail recipient that is other than a physical address or mailing address of the customer. Desirably, customers may create a virtual/vanity address for use in lieu of their mailing or physical address via the customer interface 102.

Figure 2:
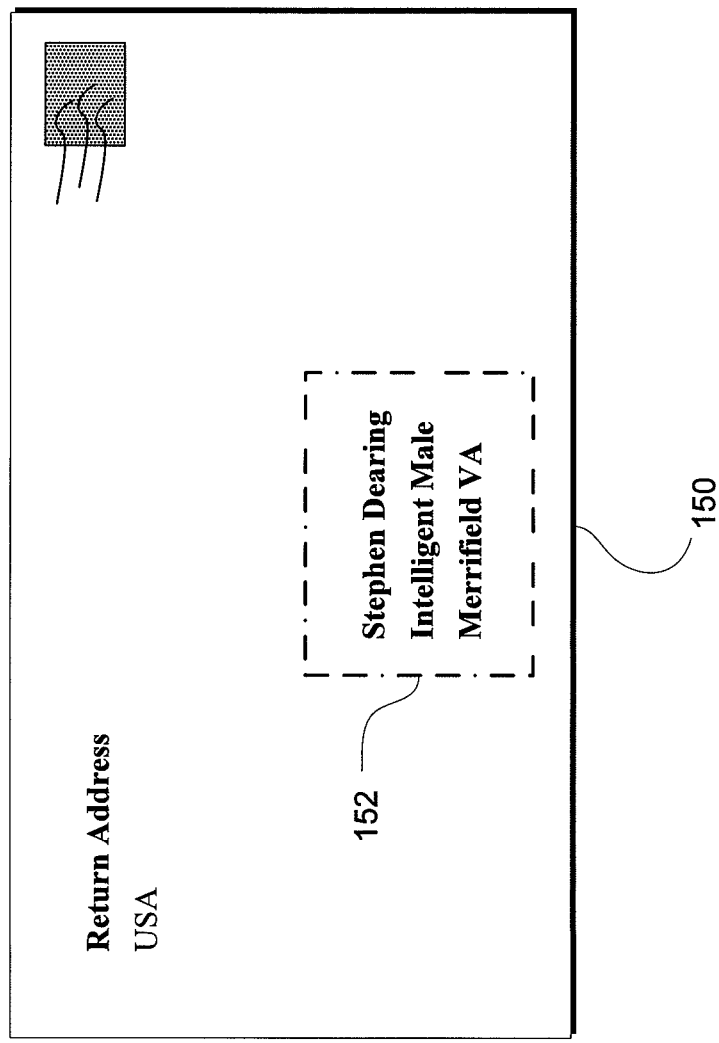
FIG. 2 is an illustration of an example mail item addressed to a virtual address.

FIG. 2 is an illustration of an example mail item 150 addressed to a virtual address 152. In the example, the virtual address includes the recipient's name, city, and state and virtual address portion "Intelligent Male." However, in other embodiments, some, or all, of the name, city, and/or state portions would not be included or is optional.

It is to be recognized that while FIG. 2 illustrates a mailing envelope, the item 150 may comprise any type of mailer, card, or other mail item including any suitable flat or parcel. In addition, in one embodiment, the system 100 may be configured to process electronic messages having an electronic implementation of the virtual address. For example, in one embodiment, the virtual address may be applied to a selected managed domain such as usps.com, which is recognized and either provided to the customer if they have opted for USPS domain or redirected to the email address(es) as identified through the customer profile. Virtual Addressing could be shared through licensed link technology (SHA to SHA) to 3rd parties in need of this information. For example, the virtual address service includes delivery and/or emergency services where need of the physical location is necessary. This methodology only provides the other information when the correct information is submitted and therefore privacy is maintained.

In one embodiment, the preference management service 102 is configured to prevent definition/registration of duplicate virtual addresses by customers. The preference management service 102 may also be configured to do things such as: reserve specified 'candidate' virtual addresses for premium use; either restrict or effectively manage common names such as 'Robert Johnson' or 'Mary Smith' (Robert Johnson1, Robert Johnson2, etc.); and reserve 'likely' requests for virtual addresses such as registered trademarks or other terms anticipated to have high demand. The preference management service 102 may also be configured to manage the 'selling' or other distribution of previous assigned virtual addresses to a new customer via mutual agreement. The preference management service 102 may charge a percentage or fee for the transaction going to the USPS or other delivery service for oversight and management.

The preference management service 102 may also be configured to restrict use of profanity, obscenity, vulgarity, or other controversial or offensive terms. In addition, the preference management service 102 may be configured to manage 'expired' virtual addresses to convert such addresses, for example, via a mail forwarding mechanism, back to mailing or physical addresses or to instruct the delivery management system 108 to provide an 'Undeliverable' indication for items addressed to such expired addresses. The preference management service 102 may also be configured to allow customers of virtual addresses or other preference services to 'opt' in for additional physical mail security such as detection and irradiation as a delivery option.

Figure 3:
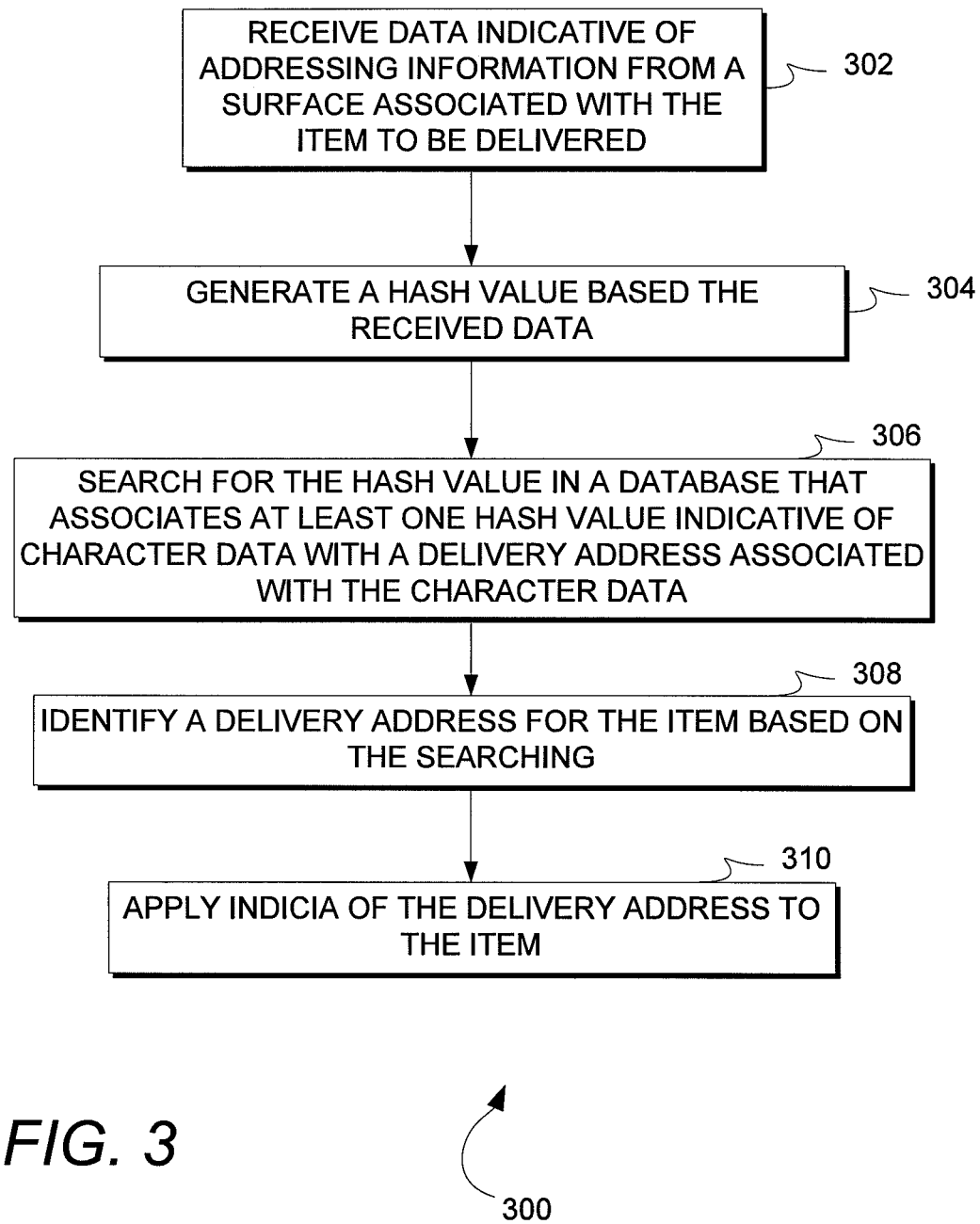
FIG. 3 is a flowchart illustrating one embodiment of a method of delivering an item based on a virtual address.

FIG. 3 is a flowchart illustrating one embodiment of a method 300 of delivering the item 150 based on the virtual address 152. The method 300 begins at a block 302 in which the mail processing system 110 receives data indicative of addressing information from a source associated with the item to be delivered. In one embodiment, the addressing information comprises one or more of a name, virtual address, and a city and/or state. The addressing information may be received via an optical character recognition (OCR) device, a barcode reader, or any other suitable electronic reading device, including manually entered data from an input device when, for example, the information on the item is not electronically legible. In some embodiments, if the address information on the item is unable to be processed, for example, if the mail processing system 110 is unable to read the addressing information or if no address, virtual or otherwise, matches, an operator may manually key in the addressing information.

Next at a block 304, the mail processing system 110, or optionally, the delivery management service 108, generates a hash value based on the received addressing information data. In one embodiment, generating the hash value comprises generating a cryptographic hash. Generating the cryptographic hash may comprise performing a "Secure Hash Algorithm" (SHA), e.g., a SHA-1, SHA-2, etc. hash.

Moving to a block 306, the delivery management service 108, in response to a query from the mail processing system 110, searches for the hash value in a copy of the database 106 that associates at least one hash value indicative of character data such as a virtual address 152, with a delivery address associated with the character data. A master copy of the database 106 may be accessed or the instance of the delivery management service 110 may have a distributed copy of the virtual address information from the database 106. Next at a block 308, a delivery address for the item is identified based on the information in the database 106 for the item 150 as a result of the searching. The delivery address may be a physical address or a mailing address such as a postal box.

Proceeding to a block 310, the mail processing system 110 applies an indicia of the delivery address to the item 150. The indicia of the address may comprise a text address or a barcode. In one embodiment, the indicia comprises an Intelligent Mail® (trademark of the US Postal Service) Barcode which is a barcode that comprises information indicative of delivery point routing. In one embodiment, such barcodes further comprise indicia such that if an item were undeliverable, the item is destroyed rather than returned to sender so as to maintain the privacy of the actual delivery address by preventing the return of the addressed item. The indicia may be applied via any suitable mechanism including application of a forwarding label such as is employed by mail forwarding systems.

As noted above, the database 106 can also store mail preferences, both electronic and physical, of customers based on a hash value of the customer's specified address.

Such hash values may also comprise a cryptographic hash. The database 106 relates the cryptographic hash with a delivery address.

Figure 4:
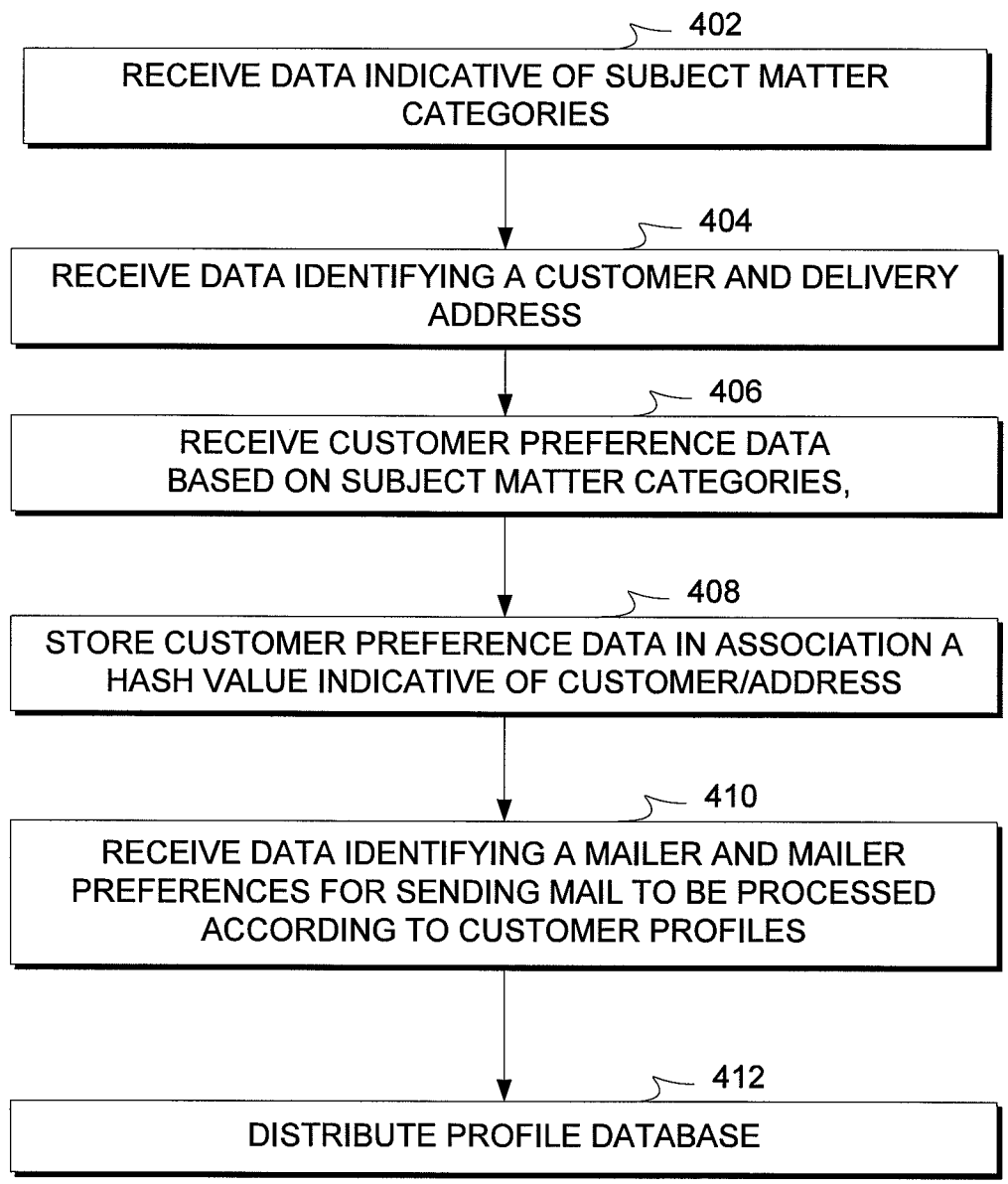
FIG. 4 is a flowchart illustrating one embodiment of establishing recipient delivery preferences.

FIG. 4 is a flowchart illustrating one embodiment of a method 400 of establishing recipient delivery preferences in the database 106. The method begins at a block 402 in which the preference management service 102 receives data indicative of subject matter categories of electronic or hardcopy communications. Such categories can be used by the delivery management service 108 to direct delivery of communications according to the recipients stored preferences in the database 106.

In one embodiment, mail categories are relationally tiered. For example, the categories may comprise a selection of generalized major top-level categories, where all the sub-categories are inclusive, or to specify in more detail the sub-categories. The mail categories may be established and defined by the general consumer and/or managed by the delivery service, for example, the USPS. In one embodiment, users may post suggestions for categories via the customer interface 104. In one such embodiment, a consensus type process may thus be established that incorporates customer input and changes into the mail categorization database. Mailers may also provide input to help establish categories that can be readily determined by the mail.

As an example of the category development process and category database structure, a Customer A defines a major category of 'Food' and defines 'Fast Food' as a sub-category of 'Food.' Consensus received via the customer interface 104 provides acceptance of this request, and the change is incorporated into the database and therefore reflected in the customer profile application. In another example, Customer B defines a major category of 'Restaurants' and defines a sub-category of 'Fast Food.' The consensus established via users through the customer interface 104 provides acceptance of this request, and the change is incorporated into the database. Customers may subsequently reflect the categorization in their profile. For example, customers who have selected 'Fast Food' in their profile would now be associated with 'Food'-'Fast Food' and 'Restaurants'-'Fast Food'.

In one embodiment, the management of the mail categorization information is structured by use of a logical and relational directory structure. For example, a unique set of IDs is assigned to major categories. The subcategories under the major categories then have a unique set of IDs 'under' and related to the major category and so on and so forth for each subcategory underneath. For example; the major category of 'Food' might have an ID of 12345, and the subcategory of 'Fast Food' might have an ID under 98765. If a customer were to select the major category of 'Food' for advertisement and/or media as being preferred to be received by the customer, the major ID of 12345 would represent all subcategories 'underneath' and be considered primary. If the customer were to select 'Fast Food' that falls underneath 'Food', the new ID value becomes 1234598765 relating the major category to the subcategory. In the latter example, the major category no longer applies and the next level of subcategory becomes primary.

Moving to a block 404, the preference management system 102 receives data identifying a customer and delivery address from the customer interface 104. In one embodiment, customer profiles are per person or a defined group of persons at a particular address. In another embodiment, customer profiles are at the address level (and apply to addressees at that address) as, for example, assigned by the USPS or other delivery service.

To establish a profile, a customer's credentials may be established via any suitable system or method. For example, the preference management system 102 may be configured to validate customer credentials through a combination of bank card (credit or debit) validation and/or hardcopy letter verification similar to that employed by the USPS for move validation letters used in the change of address process. Following initial establishment of the customer's credentials, the customer may be assigned a unique user identification and password to subsequently access the service 102. In one embodiment, a unique system identifier may also be established for the customer for use, for example, in relating information in the database 106.

Subsequent to establishing a user name to log into the service 102, moving to a block 406 the customer may set up a basic profile such as Name, Physical Address, Mailing Address, City, State, ZIP Code, Phone, email-1, email-2, email-3, etc. In addition, the customer may establish the scope of the profile, such as the individual, other specified household members, and/or the entire address, along with whether the profile is to apply to physical mail and/or electronic communications. The preference management system 102 may also assign an indicator of the selected profile type.

In one embodiment, the preference management system 102 may also receive and store virtual address information as part the user name established for mail preference information. The preference management system 102 may also provide additional services to registered users such as the ability to generate electronic postage. Other postal delivery options such as optional irradiation or other processing of mail may also be selected via the customer interface 104 to the preference management system 102.

In one embodiment, the delivery management service 108 may also be configured to provide a gateway from physical mail to electronic mail and from electronic mail to physical mail. For example, in one embodiment, based on profile preference data, the delivery management service 108 is configured to receive electronic communications, identify particular electronic communications based on preferences from the database 106 for the recipient, and selectively generate and instruct delivery of hardcopy to the recipient. Hence, a customer who was unable to receive hardcopy delivery of a physical mailing, for example, due to his or her physical condition or other reasons, is able to receive electronic communications. Further, by using the selectivity provided by the database 106, such conversion can be performed automatically with reduced likelihood of overwhelming the customer.

In one embodiment, preference management system 102 may identify hardcopy communications that are to be converted into electronic communications. Once identified, the communications are sent to the provided email or other electronic address. Desirably, customers who are away from home are able to receive important communications which maybe determined by postal class and size or weight. For example, only small first class mail communications may be converted. Hence, the option may be set to email only such that hardcopy mail is redirected to a process that opens the mail, scans the contents, and converts it to electronic media for sending to the recipient via their service provider. Emails provided to the customer through this feature of the delivery management service 108, in one embodiment, receive an electronic Postmark with an acknowledgement or receipt optionally sent back to the sender. In one embodiment, a profile of the sender may be identified such that such receipt is sent electronically to an email address identified by the sender's preference account. The delivery management service 108 may be further configured to communicate with email service providers that participate in the system 100. The communication would provide, for each mailing and to each sending customer, information confirming that the mailing was processed through the system 100 and optionally identifying the delivery service, such as the USPS.

If the option is set to hardcopy only, any intended emails are converted to hardcopy mail at the closest managed mail generating facility, the appropriate postage is applied, and funds are deducted from the recipients account. The hardcopy communications may be optionally tracked, for example, via an Intelligent Mail® Barcode applied to the hardcopy. If the option is set to 'both', an additional option is provided to manage the receipt of the information. For example, in one embodiment the option includes a time frame for acknowledgement or 'receipt' of the electronic communication. If the 'receipt is not received within the set time frame, an option for a hardcopy mail piece to be generated and sent to the mailing address with an Intelligent Mail® Barcode that enables physical tracking is provided.

Moreover, while the above discussion includes establishment of a customer profile in the database 106 via the preference management system 102, it is to be recognized the customer interface 104 may also be used to subsequently update profile information via the preference management system 102.

As discussed above, the customer may use the customer interface 104 to define mail, including advertisements, and/or media preference based on the received subject matter categories. In one embodiment, the customer may also define geographical preferences such as 'Local', 'Regional', 'National' and/or 'International.' The geographical preferences may be defined for each mail category or subcategory, for each recipient covered by the profile, and/or globally for the profile. In one embodiment, the geographic preferences are based on the originating company location. If no preference is set for this feature, the default is 'All'.

In one embodiment, the database 106 may comprise a relational geographical reference database which is used to share this information with various industry partners such as mailers using the system 100. In one embodiment, the geographical reference database uses the geo-coordinates of a postal facility that has responsibility for the City, State and/or ZIP Code and applies a mileage parameter based on the customer profile to determine what the customer considers their local or regional territory. All City, State, and or ZIP Codes associated with the postal facilities that fall within the radius set by customer preference may apply and relate to the originating company's location (City, State, and/or ZIP Code). The geographical reference information may be further defined by radially distant regions defined based on the physical address in the customer profile. In one embodiment, a customer can select any other defining parameter for use in determining what a customer considers their local or regional territory. A local or regional territory may be determined, for example, using a parameter associated with a geographic region. Such a geographic region associated with a parameter may be contiguous or non-contiguous, and may include, for example, a governmentally defined region such as a county, state, or country, a communication region such as a zip code, IP address, or area code, or any other regional designation. The "National" preference may, for example, encompass the US and its territories and the "International" preference may be everything outside of the US and its territories. The geographical delivery preferences may be configured to apply to hardcopy and/or email.

Moving to a block 408, the customers preferences are stored in the database 106 using the hash value of the selected address to map to the preferences for that address. Additional indices, for example, between user login and preferences, may also be stored in the database 106.

Next, at a block 410, the preference management system 102 receives data identifying a mailer and mailer preferences for sending mail to be processed according to customer profiles. In one embodiment, mailers participate in the process through a portion of the customer interface 102 or other suitable interface. Similar to recipients, the mailer establishes and uses a login via web site or retail kiosk and provides base profile information such as Company Name, Physical Address, Mailing Address, City, State, ZIP Code, Phone, email-1, email-2, email-3, etc. Mailer credentials may be established and validated through a combination of bank card, credit or debit, validation and/or hardcopy letter verification similar to the move validation letters used in the change of address process. Similar to recipients, mailers are assigned user IDs and passwords and unique IDs by the system 100. In addition, mailers profiles in the database 106 include indicators, selections of categories, of the type of advertisement and/or communications they send via the system 100. The mailer profile may further include all City, State, and/or ZIP Codes in which the mailer conducts business in order to provide geographical related preference selectivity to recipients of communications from the mailer. Electronic postage and postage charges, including those incurred through participation in the system 100, may be provided via the user account of the mailer. In one embodiment, the mailer may be assigned a unique ID from the system 100 that may be used in communication/media to provide customers/recipients the ability to report misuse or to effect an 'opt out' option from communications of the mailer.

Moving to a block 412, information in the stored profile database 106 is distributed. In some embodiments, information stored in the profile database 106 is distributed via transmission of information, and on some embodiments, information stored in the profile database 106 is distributed by providing database access. In one embodiment, the portion of the database comprising the hash values along with their corresponding category and/or geographic preferences is distributed to participating email service providers and/or via an email service provided, for example by the delivery management service 108 for filtering, identification and mail management. In one embodiment, filtering includes blocking messages that do not contain matching hash values. In one embodiment, identification includes identifying matching hash values as being associated with the system 100 through the delivery management service 108 and providing such an indication to the recipient. In one embodiment, mail management includes processing return, read, opened and similar type receipts.

In one embodiment, the portion of the database 106 comprising the hash values, customer category and geographic preference profile information is provided to subscribing mailers to enable them to identify the customers in their database that want to receive a particular mailing based on mail category. The mailer may use the hash value to probe this portion of the database 106 such that if the hash value matches, the mailer can mail items to the customer knowing the customer has indicated that they desire to receive such mail. Incentives can be structured to provide rate discounts for matches, certification for demonstrated performance in suppression of mail where there is no match, and/or other methods to ensure compliance. Moreover, non-compliant mailers may have privileges and access to the database 106 revoked.

Figure 5:
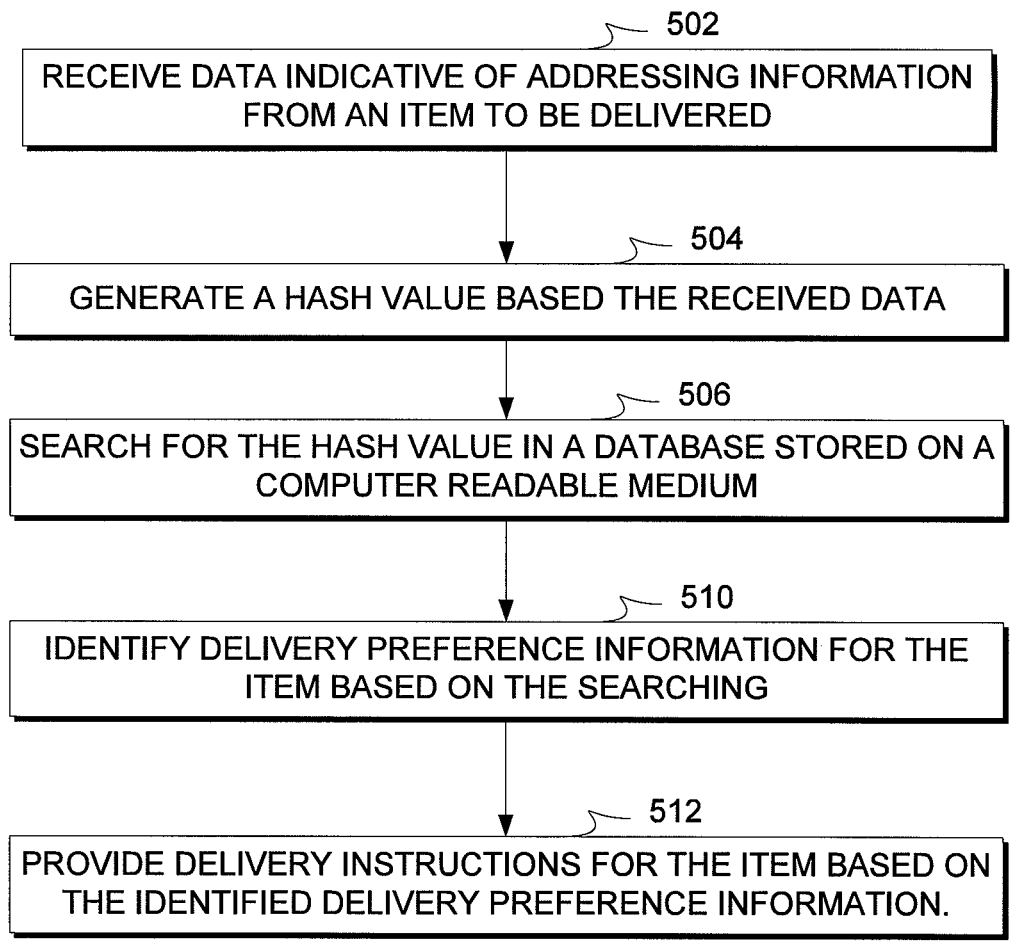
FIG. 5 is a flowchart illustrating one embodiment of a method of delivering an item based on recipient preferences.

FIG. 5 is a flowchart illustrating one embodiment of a method 500 of delivering an item based on recipient preferences stored in the database 106. The method 500 begins at a block 502 in which the delivery management service 108, via a reader, such as OCR or a barcode reader, of the mail processing system 100, receives data via the reader indicative of addressing information from an item to be delivered. In one embodiment, the addressing information comprises the mailing address and, optionally, the recipient name. Moving to a block 504, the delivery management service 108 generates a hash value, for example, a cryptographic hash, indicative of the received address data. The delivery management service 108 may generate a hash for the address including the recipient and a hash for the address without the recipient.

Proceeding to a block 506, the delivery management service 108 searches for the hash value, or hash values of the addressing information with and without the addressee, in the database 106. Next at a block 510, the delivery management service 108 identifies delivery preference information for the item based on the searching of the database 106.

Proceeding to the block 512, the delivery management service 108 provides delivery instructions for the item based on the identified delivery preference information. In one embodiment, the instructions are based on a comparison of geographic data associated with a sender of the item against the recipient's identified preferences. In one embodiment, one or more categories associated with the item are compared to categories of the recipient's identified preferences to determine the delivery instructions. In one embodiment, the sender and the associated address is determined based on a return address that may also be read by the mail processing system 100 along with the addressing information for the item. In this embodiment, this sender address information is used to apply the recipient's geographic preferences. In one embodiment, categories for non-participating mailers are determined based on categories for that sender's communications that are provided by recipients.

In the case of participating mailers, the mailers' profile may be obtained by generating a hash value for a return address of the item, or it may be obtained directly from an additional endorsement or barcode provided on the item by the mailer. The category for the item may then be determined based on information in the mailers' profile, for example, global categories for all mail pieces from that mailer, or a particular profile of the mailer used on the particular mail piece. The category may also be determined based on additional category information that the mailer provides on the item such as part of the barcode, for example, an Intelligent Mail® Barcode, that includes, or is additional to, the hash value.

In one embodiment, the delivery management service 108 is configured to provide an interface to direct marketers. The service 108 provides a portion of the database 106 comprising hash values representing individual customer preferences based on mail categorization and customer profile to mailers for their desired target market. Desirably, only the non-identifying hash value is provided to the mailer so as to maintain the privacy of the customers and their profiles. The respective hash value of each recipient is included in the email and/or electronic correspondence to an email server associated with the delivery management service 108. These hash values may also be placed directly on mail pieces or contained within an Intelligent Mail® Barcode and presented for acceptance to the delivery service, for example the USPS, via the mail processing system 110. After acceptance, a portion of the mail processing system 110 reads the hash value or barcode, matches it to the correlating customer information, and applies the appropriate delivery address information. Additional features such as automated billing, delivery summary information, and mail performance may be provided for the mailer.

Figure 6:
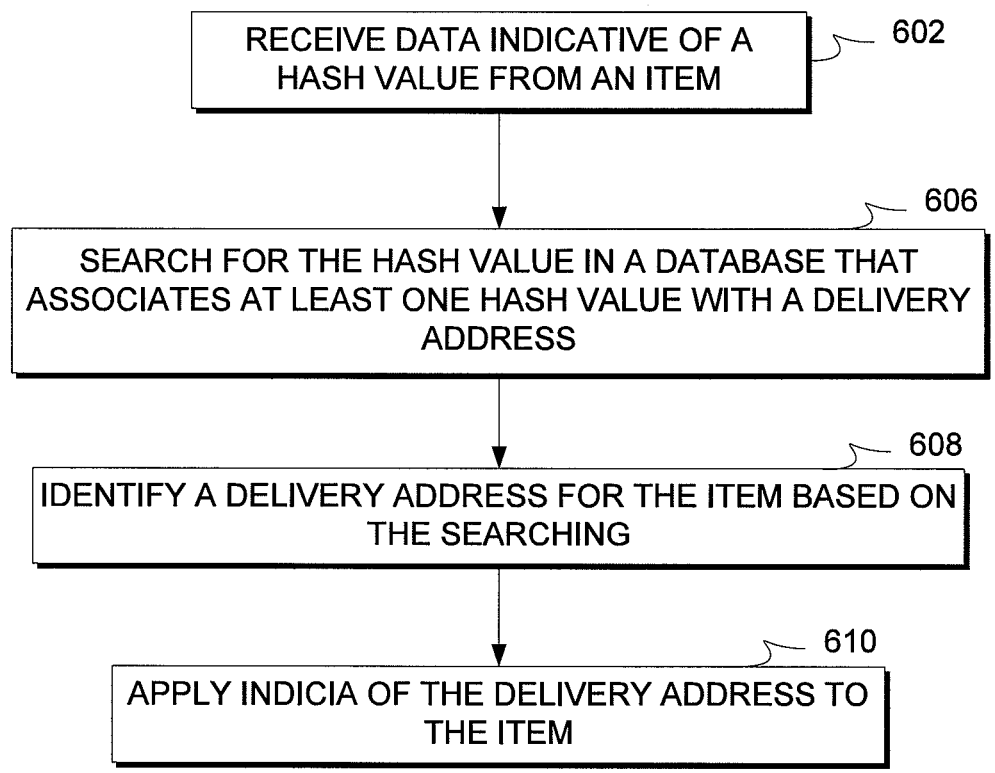
FIG. 6 is a flowchart illustrating one embodiment of another method of delivering an item based on recipient preferences.

FIG. 6 is a flowchart illustrating one embodiment of a method of delivering an item addressed with a hash value from a direct marketer. In particular, at a block 602, delivery management service 108 and/or mail processing system 110 reads the hash value, as text or a barcode, associated with the mail item. Next at a block 606, the delivery management service 108 matches the hash value to the respective customer profile information. Moving to a block 608, the delivery management service 108 identifies a mailing address from the matched customer profile. Proceeding to a block 610, the mail processing system 110 redirects to the correlating customers based on the preferences set in their profile by applying indicia of the delivery address to the item.

Figure 7:
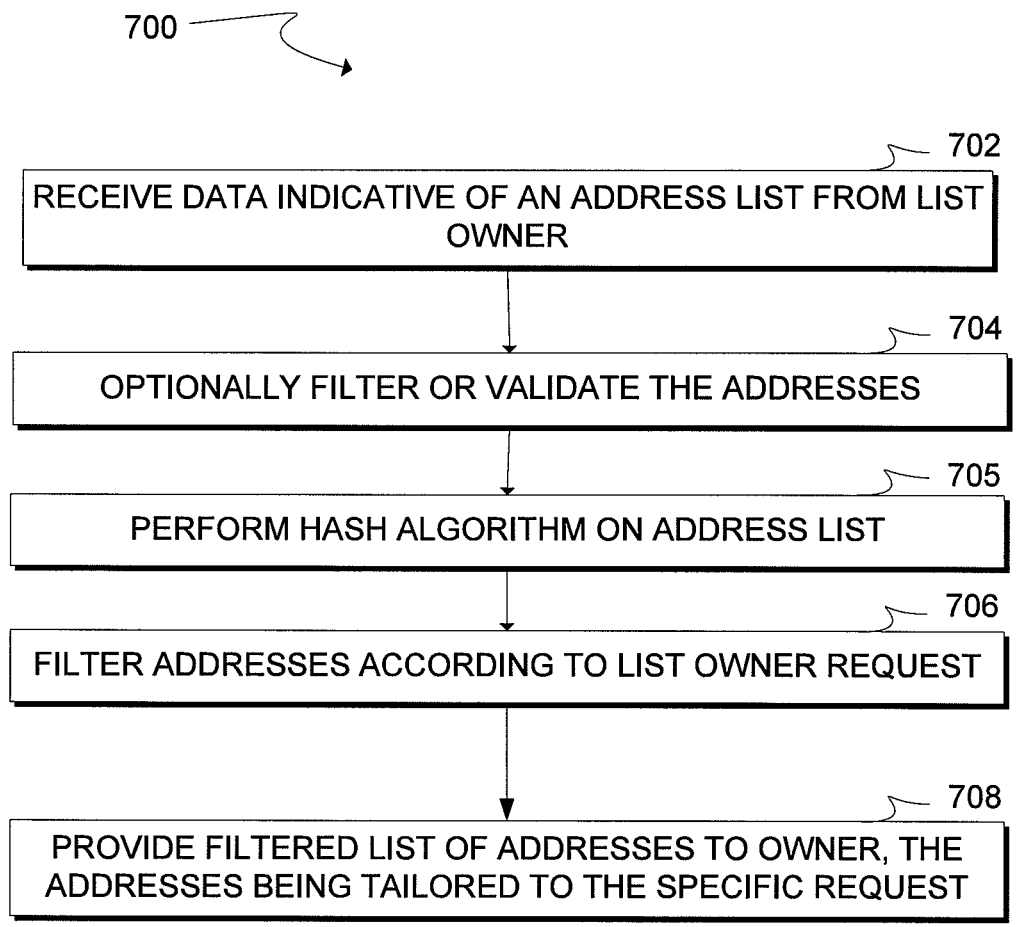
FIG. 7 is a flowchart illustrating one embodiment of another method of delivering an item based on an address list.

FIG. 7 is a flowchart illustration of one embodiment of a method of delivering an item based on an owner's existing address list. To make use of the virtual or hashed addresses, an owner of an address list first contacts the delivery service, for example, the USPS or UPS. At state 702, the list owner submits data indicative of the address list to the delivery service, which is then in receipt of the address list from the list owner.

In one embodiment, at a state 704 the delivery service performs a filtering or validity check of the address list. In one example of a validity check 704, the delivery service first submits the addresses through a known database, such as a change of address or delivery point validation database, to ensure the address is correct. Addresses that are found to be invalid are stored in a separate area of storage and are identified to the list owner so that the list owner can correct incorrect information or delete the addresses from the list.

Next, at state 705, the delivery service applies a hashing algorithm, as described previously, to the address list provided by the list owner, such that each of the hashed or virtual addresses corresponds to one of the addresses on the list submitted by the owner. In one embodiment, in order to facilitate the hashing or encoding of addresses, the delivery service may allow certain address list owners to hash or encode their own addresses. This entails the use of an approved encoding or hashing method. The hashed or encoded address results are then be communicated to the delivery service, for example, the USPS, for inclusion into the preferences database 106.

In one embodiment, the list owner may also choose to incorporate a code into the encoding or hashing. This code provides options to the list owners that may facilitate leveraging the list for monetary gain or ensuring proper use of the addresses. Thus, in some embodiments, a list owner may use code incorporated into the encoding or hashing to track mailings using the address list and to verify proper use of the address list. The code that is incorporated into the hashing or encoding process may contain a delivery service internal code for service, for example, a USPS code for privacy, a determined code for preferences, a private code or company code. The code may be used to show the list owner, preferences, service requests, services or use limitations for the address, origination, and/or other security features. If the list owner uses an encoding or hashing process on his list, the resultant list of hashed or encoded addresses is then be communicated to the delivery service along with the relevant requests for services. The delivery service then obtains a list of the encoded addresses, as discussed below, along with relevant add-on services that the delivery service is to perform.

At state 706, the delivery service filters the addresses sent by the list owner based upon a database of preferences supplied by the customer/addressee. The filter may be based upon, for example, an expected campaign by the owner, a location, a geographical area or other information supplied by the customer. In this way the owner may receive a list of addressees back from the delivery service that is tailored to the specific request. For instance, if the list owner wants to know who is interested in a certain topic or item, the owner sends the addresses to the delivery service (as outlined above at 702). At 706, the delivery service submits the addresses through the preferences database 106 to correlate the addresses from the owner's list to the specific criteria for which the owner is seeking. The type of address returned by the delivery service depends on the requirements of the list owner. The delivery service can return the virtual address that the customer has on record at the delivery service, for instance the USPS, if the customer so allows. The owner may also request certain services from the delivery service. These services are explained below and may be encompassed in the hashed or encoded returned address.

Advancing to state 708, the delivery service then provides the list of addresses to the list owner. In one embodiment, the addresses are in plain form. In another embodiment, the addresses are in virtual form based on the customer preference, hash form or encoded form. If a hashed or encoded form is used, the actual address of the person with this preference is anonymous. The list owner will know that one or more of his customers lives in the specified area and is interested in the desired subject matter, but he will not be able to identify which customer. The owner of the list may then proceed to use the addresses as intended or needed.

In view of the above, one will appreciate that embodiments desirably provide one or more of the following features and advantages. For example, the system 100 can provide advantages such as enabling a trusted party, e.g., the United States Postal Service to manage and/or direct the delivery or presentation of "customer-directed" hard copy and electronic communications while protecting customer privacy.

It is to be recognized that depending on the embodiment, certain acts or events of any of the methods described herein can be performed in a different sequence, may be added, merged, or left out all together. Not all described acts or events are necessary for the practice of the method. Moreover, in certain embodiments, acts or events may be performed concurrently, for example, through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application and embodiment.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the improvements as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of processing items to be delivered, the method comprising:
    storing, by a hardware processor in a database on a non-transitory computer readable medium, a first plurality of delivery addresses and customer preferences associated with each of the delivery addresses;
    generating, by the hardware processor, first hash values for only each of the first plurality of delivery addresses stored in the database;
    storing, by the hardware processor, the first hash values;
    receiving, by processing equipment of a delivery service, a second plurality of delivery addresses for customers and one or more sender criteria;

generating, by the processing equipment of the delivery service, second hash values for each of the second plurality of delivery addresses;

searching, by the processing equipment of the delivery service, the database for first hash values corresponding to each of the second hash values;

storing, by the processing equipment of the delivery service, the second hash values;

accessing, in the database using the hardware processor, the customer preferences for each of the first hash values for which a corresponding second hash value is stored;

comparing, using the hardware processor, the one or more sender criteria to the customer preferences associated with the one or more of the plurality of delivery addresses for which a corresponding second hash value is identified;

generating, by the processing equipment of the delivery service, a third plurality of delivery addresses of the plurality of delivery addresses for which the customer preferences correspond to one or more of the received sender criteria;

providing, by the processing equipment of the delivery service via an electronic interface, a plurality of first or second hash values of delivery addresses on the generated third plurality of delivery addresses;

receiving, in processing equipment of a delivery service, an item having at least one of the plurality of first or second hash values thereon;

reading, in the processing equipment, the first or second hash value from the item; determining, in the processing equipment, the delivery address for the item based on the read first or second hash value;

identifying, in the processing equipment, that the determined delivery address is based on the read first or second hash value;

prior to attempting delivery of the item, generating, in the processing equipment, an instruction to not return undeliverable mail in response to an undeliverable indication;

coding, in the processing equipment, the instruction in a barcode in response to the identifying; and redirecting the item by the processing equipment based on the determined delivery address.

2. The method of claim 1, wherein the sender generates the second hash values.

3. The method of claim 1, wherein the sender criteria comprises geographic location.

4. The method of claim 1, wherein the determined delivery address comprises a virtual address.

5. The method of claim 1, further comprising receiving, by the hardware processor, a user code; and combining, by the hardware processor, the user code with a delivery address prior to generating a one of the second hash values.

6. The method of claim 1, additionally comprising receiving, using the hardware processor via an interface, the customer preferences from customers, and storing the customer preferences in the database.

7. The method of claim 1, wherein the delivery address for a customer is a physical address.

8. The method of claim 1, additionally comprising preventing the sender from obtaining actual addresses of customers by providing, by the processing equipment of the delivery service, to the sender the plurality of first or second hash values of delivery addresses on the generated third plurality of delivery addresses.

9. The method of claim 1, further comprising applying, in the processing equipment, an indicia to the item.

10. The method of claim 9, additionally comprising coding in the processing equipment the delivery address of the customer in the indicia.

11. The method of claim 1, further comprising determining, by a delivery management system, an undeliverable indication for the item, and identifying by the processing equipment of the delivery service the item for destruction rather than delivering the item to the customer or returning the item to the sender based on the undeliverable indication.

12. The method of claim 8, wherein the sender places the first or second hash value of one of the delivery addresses from the generated third plurality of delivery addresses onto the item before providing the item to the delivery service for delivery.

13. The method of claim 1, wherein the customer preferences include subject matter categories of electronic or hardcopy communications, and geographical preferences.

14. The method of claim 1, wherein the database comprises a relational geographic reference database, and wherein the customer preferences are accessed using the relational geographic reference database.

15. The method of claim 1, wherein the preferences for each customer are stored in the database using the hash value of the corresponding delivery address to map to the preferences for that address.

16. The method of claim 1, wherein the barcode is an intelligent mail barcode.

17. The method of claim 1, additionally comprising providing a vetted preferences designation for indication to the customer on physical or electronic communications sent to the customer in response to the identifying.

* * * * *